Figure 1:
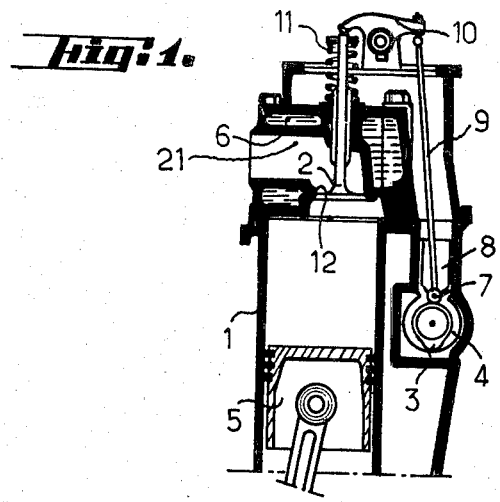

United States Patent [19]

Curtil et al.

[11] 4,296,715
[45] Oct. 27, 1981

[54] APPARATUS FOR EXTERNAL COOLING OF AN EXHAUST VALVE

[75] Inventors: Rémi Curtil, Montsoult; Alain Devaux, Saint Mande, both of France

[73] Assignee: Societe d'Etudes de Machines Thermiques S.E.M.T., Saint-Denis, France

[21] Appl. No.: 9,072

[22] Filed: Feb. 2, 1979

[30] Foreign Application Priority Data

Feb. 24, 1978 [FR] France .............................. 78 05399

[51] Int. Cl.³ .............................................. F01L 1/34
[52] U.S. Cl. ................................................ 123/90.15
[58] Field of Search ................ 123/90.1, 90.15, 90.16, 123/90.17, 90.12, 90.19, 90.11

[56] References Cited

U.S. PATENT DOCUMENTS 2,647,500  8/1953  Lang .................................. 123/90.6
2,862,485  12/1958  Skinner ......................... 123/90.6 X
3,786,792  1/1974  Pellizzoni et al. ........... 123/90.17 X

FOREIGN PATENT DOCUMENTS 566592  12/1932  Fed. Rep. of Germany .
527918  8/1921  France ............................... 123/90.6
812976  2/1937  France .
2271393  12/1975  France .
16444  of 1912  United Kingdom ............... 123/90.6

Primary Examiner—Harry N. Haroian
Attorney, Agent, or Firm—Kenyon & Kenyon

[57] ABSTRACT

This invention relates to a method and devices for improving the external cooling of an exhaust valve of internal combustion engines. This method consists in extending the open period of the exhaust valve beyond the normal closing instant by preventing it from closing completely at that instant but by reducing the free flow section between the valve and its seat to a residual value which is substantially constant and small compared to the maximum flow section corresponding to the full opening of the valve. Said devices comprise means for obtaining such residual opening of the exhaust valve.

5 Claims, 4 Drawing Figures

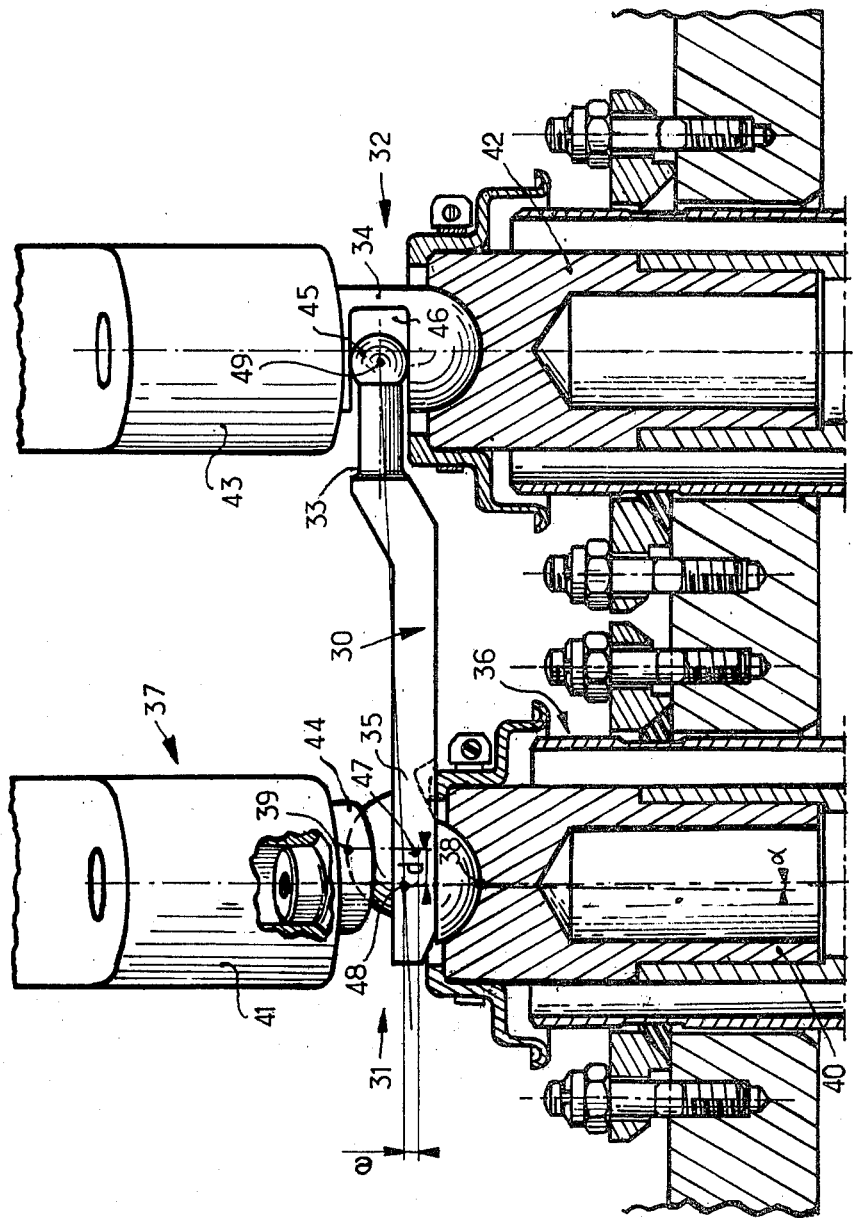

APPARATUS FOR EXTERNAL COOLING OF AN EXHAUST VALVE

The present invention relates essentially to a method of improving the external cooling of an exhaust valve for an internal combustion engine, particularly a preferably supercharged Diesel engine, as well as a device for carrying out the said method.

There is already known a method for external-ventilation cooling of the exhaust valves in a supercharged Diesel engine. According to this known method, provision is made for a mutual overlapping, of a predetermined value (up to a crankshaft rotation angle of 140°), of the opening periods of the intake and exhaust valves, respectively, of a same cylinder to allow the exhaust valve to be cooled by the portion of intake air that passes directly from the open intake valve into the open exhaust valve. The volumetric efficiency $p_{vol}$ of the air flow at each suction stroke relative to the cylinder may reach about 1.4.

Such a method, however, results in a low-efficiency cooling and a poor energy balance. For instance, if the aforesaid overlapping is increased so as to increase the total air flow by 10% beyond the minimum threshold corresponding to the amount of air necessary to scavenge the greater part of the residual gases, the temperature of the valve decreases by only 10° to 20° C.

Now an increase of, for example, 10% in the total intake-air flow involves an increase in the input power to the exhaust-gas turbine of the turbosupercharger and consequently a higher power take-off from the exhaust gases, thus finally causing increased fuel consumption for a same engine-shaft useful output and a same supercharging air pressure. For a same amount of air in the cylinder, this therefore results in a reduction in the amount of excess combustion-air. Since the temperature of the exhaust valve is very sensitive to the variations of the excess combustion-air, this drop in the amount of excess air leads to an exhaust-valve temperature increase equal to or higher than the temperature decrease previously obtained by the cooling effect. This results in the expected cooling being annulled or even negative, that is to say, there occurs an increased heating of the exhaust valve.

The purpose of the present invention is therefore to remedy the afore-mentioned drawbacks by providing a solution allowing the exhaust valves of an internal combustion engine, particularly a preferably supercharged Diesel engine, to be cooled more efficiently without however reducing the excess of combustion air.

This solution consists, according to the invention, of a method of improving the external cooling of an exhaust valve for an internal combustion engine, of the above-described type, characterized in that it consists in extending the time during which the exhaust valve is kept open (the "open time" of the exhaust valve) beyond the normal instant of closing, by preventing it from closing completely at that instant but by reducing the free flow section between the valve and its seat to a residual valve which is substantially constant and small compared to the maximum flow section corresponding to the full opening of the valve. Advantageously, the instant of delayed closing of the exhaust valve substantially coincides with the normal instant of closing of the intake valve.

Preferably, the said reduced flow section is equal to or smaller than about 10% of the maximum flow section of the fully open exhaust valve.

The present invention also relates to a device for carrying out the above method, characterized in that it comprises the means necessary to achieve the technical function defined by the said method. According to a first form of embodiment of the said device, the said necessary means are constituted by an additional boss of the operating cam associated with each exhaust valve, which allows the latter to be kept in a residual open position and the ends of which connect substantially gradually and smoothly with the exhaust-valve opening and closing main boss and the circular base profile of the cam, respectively.

According to a second form of embodiment of the said device, for an engine provided, for each valve, with an actuating system connecting the engine camshaft to the said valve, the actuating system of each exhaust valve is acted upon by the actuating system of the intake valve of the same cylinder through a coupling connection, such as in particular a mechanical coupling connection, between the said actuating systems, allowing the said exhaust valve to be kept in an at least residual open position.

In the case of valves operated through the medium of push-members and rocker arms, the said device is characterized in that the said mechanical coupling connection comprises a lever intercalated in the said actuating system and connecting the actuating system of at least one exhaust valve to the actuating system of at least one intake valve of the same cylinder, one end of the level being movably connected, in a kinematically compatible manner, to an element of the actuating system of the intake valve, whereas the other end of the lever is intercalated in the actuating system of the exhaust valve, thus separating the latter into two portions which, through the medium of a movable joint such as, in particular, a spherical joint co-operates with the lever at two fulcrums or bearing points transversely shifted from one another along the lever, the resulting lever arm being such that the opening movement of the intake valve causes a predetermined residual opening of the exhaust valve.

In the case of an engine with hydraulically operated valves, the device according to the invention is characterized in that the hydraulic operating means of the exhaust valve are associated with automatic control means ensuring the fulfilment of the afore-mentioned function.

Figure 2:
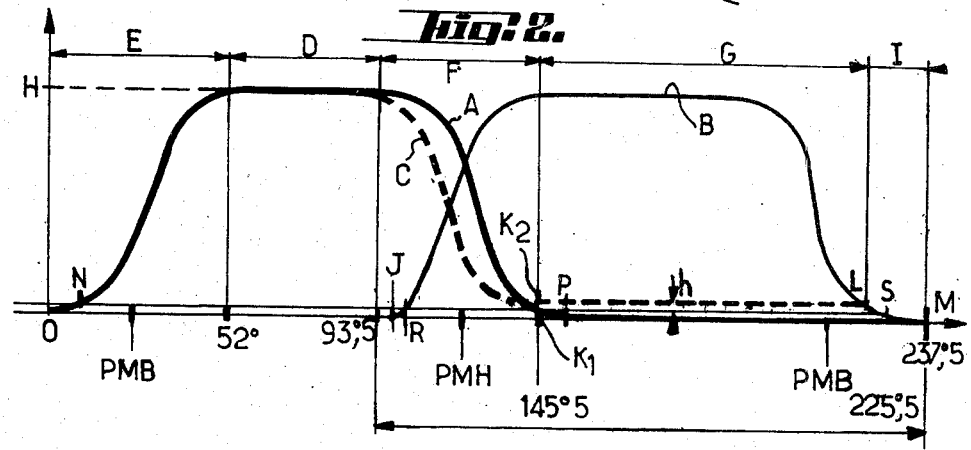
Figure 3:
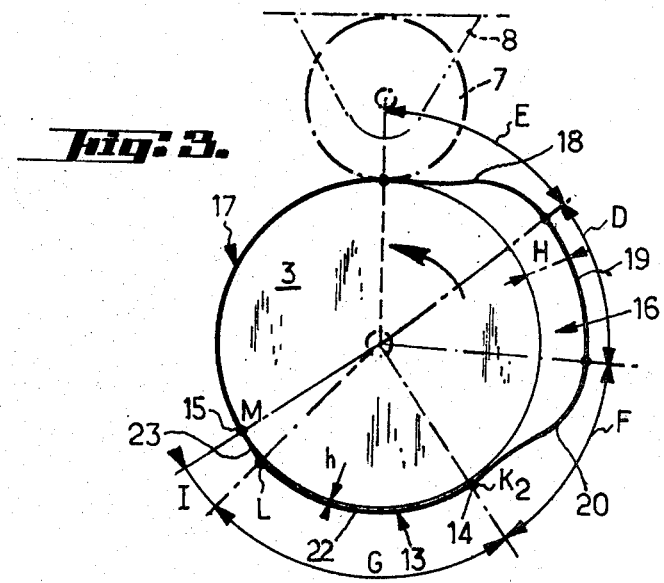

Other purposes, advantages and characterizing features of the present invention will appear more clearly as the following explanatory description proceeds with reference to the appended drawings illustrating two presently preferred forms of embodiment of the invention, given solely by way of example. In the drawings FIG. 1 is a partial vertical cross-sectional view of a Diesel engine, in the region of an exhaust valve operated through the medium of a rocker arm by means of an individual cam designed according to the present invention;

FIG. 2 shows the curves representing the lift (axis of ordinates) of the exhaust valve (curves A and C) and of the intake valve (curve B) against the angle of rotation of the camshaft (axis of abscissas). Curves A and B show respectively the lifts of the exhaust valve and of the intake valve in the case of a cam of the prior art, whereas curve C shows the lift of the exhaust valve in the case of a cam according to the present invention;

FIG. 3 is a detailed view, to a larger scale, of the cam represented in FIG. 1;

FIG. 4 illustrates a second form of embodiment of the device according to the present invention and is a rear view of the movable joints between the push-member and rocker arm of the intake valve and the push-member and rocker arm of the exhaust valve of a same cylinder, showing the lever constituting the mechanical coupling connection whereby the actuating system of the exhaust valve is acted upon by the actuating system of the intake valve of the same cylinder.

Referring to FIG. 1, each cylinder 1 of an internal combustion engine such as, in particular, a preferably supercharged Diesel engine, is provided with at least one intake valve (not shown) and at least one exhaust valve 2 operated by a cam 3 secured on a camshaft 4. In the example illustrated, there are shown the piston 5 in the cylinder 1 and the flow path 6 of the cylinder-head cooling fluid. The cam 3 of the camshaft 4 operates the valve 2 through the medium of a roller 7 mounted on a tappet 8 jointly movable with a push-rod 9 connected to a rocker arm 10 acting upon the valve 2. A return spring 11 tends to close the valve 2 by returning it onto its seat 12.

According to a first form of embodiment of the device of the present invention, illustrated in FIG. 3, the operating cam 3 of each exhaust valve 2 is provided with an additional boss 13 for keeping the exhaust valve 2 in a residual open position, the opposite ends 14, 15 of the said additional boss connecting substantially gradually and smoothly to the exhaust valve opening and closing main boss 16 and the circular base profile 17 of the cam 3, respectively.

Advantageously, the additional boss 13 is formed at least partially by an arc of circle extending concentrically with and radially outwardly of the circular base profile 17 of the cam.

The engine being here of the type whose valves (such as the valve 2) are operated through the medium of rocker arms (such as the rocker arm 10), the additional boss 13 is provided to impart to the exhaust valve 2 a residual opening lift of an order of magnitude comparable with the clearance in the valve rocker system 7–10.

According to a specific feature of the invention, the central angle D defined by the cam boss portion in the form of an arc of circle corresponding to the full opening of the exhaust valve 2 is smaller than that of a corresponding cam for an exhaust valve without residual lift.

According to a preferred feature of the device of the present invention, the radial height h of the circular portion of the additional boss 13 with respect to the circular base profile 17 of the cam 3 is equal to or smaller than about 10% of the radial height H of the circular portion of the main boss 16 with respect to the circular base profile 17 of the cam 3.

Referring to FIGS. 2 and 3, the device according to this first form of embodiment of the invention operates as follows.

The cam 3 of the camshaft 4 being in the zero angular position, as shown in FIG. 3, the valve 2 is closed, i.e. applied against its seat 12. Upon rotation of the camshaft 4, the cam 3, owing to the gradually changing connecting profile 18 of the main boss 16, first eliminates the clearance in the valve rocker system 7–10, and then causes the opening or lifting of the exhaust valve 2 (starting from the point N) from its seat 12. After the cam 3 has moved through the central angle E shown in FIG. 3, the exhaust valve 2 is fully open or lifted from its seat 12, as also seen in FIG. 2. The angle E is for instance equal to 52° of camshaft rotation. During this rotation of the cam 3 through the angle E, the piston 5 has moved past the bottom dead-centre denoted at PMB in FIG. 2.

The cam 3 thereafter moves through the angle D, which is for example equal to 41.5° of camshaft rotation, within which the arc portion 19 of the cam boss 16 corresponds to the full opening of the valve 2. During further rotation of the camshaft 4, the cam 3 moves through the angle F, equal for example to 42° of camshaft rotation, within which the boss portion 20 causes the valve 2 to close partially as shown by the portion F of the dashed curve C in FIG. 2.

It should be noted that during this partial closing of the valve 2, the lifting of the intake valve cam represented by the curve B in FIG. 2 has begun from the instant J, whereas the opening of the intake valve itself has taken place from the point R. The overlap between the opening periods of the intake valve and the exhaust valve 2, respectively, of a same cylinder has therefore started from the instant R, so that the conventional scavenging phase has begun. It will be observed that during this overlap between the periods of opening of the intake valve and the exhaust valve, respectively, the piston 5 has moved past the top dead-centre denoted at PMH in FIG. 2.

In a cam of the prior art, the boss portion 20 is so designed as to close the valve 2 fully at the instant $K_1$ at which the cam 3 has fully moved through the angle F, whereas the said boss portion 20 ended at the instant P. According to the present invention, the open period of the exhaust valve 2 is extended beyond its normal closing instant $K_1$ by preventing it from closing completely at that instant ($K_2$, curve C) owing to the additional boss 13 whose portion 22 displays a circular profile allowing the free flow section between the valve 2 and its seat 12 to be reduced to a residual valve which is substantially constant and small compared to the maximum flow section corresponding to the full opening of the valve. The circular portion 22 of the additional boss 13 corresponds to the angle of rotation G of the cam 3. This angle G, which is for example equal to 80° of camshaft rotation, is completely moved through at the instant L. It must be noted that during this rotation the piston 5 has moved past the bottom dead-centre denoted at PMB in FIG. 2.

During further rotation of the camshaft 4, the cam 3 moves through the angle I, which is for example equal to 12° of camshaft rotation, and the gradually changing connecting portion 23 of the additional boss 13 causes the valve 2 to completely close at the instant S, whereas owing to the clearance in the valve rocker system, the portion 23 of the additional boss 13 ends at the instant M. It is observed that the straight line through the points NRK$_1$S denotes the zero point of the intake valve or the exhaust valve lift.

According to the present invention, the instant S of delayed closing of the exhaust valve 2 preferably substantially coincides with the normal instant of closing of the intake valve, as shown in FIG. 2. The opening periods of the intake valve and the exhaust valve 2, respectively, of a same cylinder therefore overlap from the instant R to the instant S. During a portion of this overlap period, part of the intake air therefore cools the exhaust valve 2 by passing directly from the intake valve into the conduit 21 of the exhaust valve 2. Furthermore, between the instant $K_2$ and the instant S, the free flow section between the valve 2 and its seat 12 being reduced to a residual value preferably equal to or smaller than about 10% of the free flow passage and the maximum open position of the exhaust valve 2, there takes place a very efficient additional cooling of the valve with a substantially equal flow velocity of the air (pressure ratio between the cylinder pressure and the exhaust pressure substantially equal to the one prevailing during the conventional overlap), owing in particular to a substantial increase in the heat-exchange coefficient due to the reduced free annular passage section preventing significant air-flow separation or breakaway at the edge of attack of the bearing face and of the seat and the creation of a relatively thick boundary layer, which may occur when the valve is wide open.

Advantageously, the loss of intake air due to the aforementioned extension of the open period of the exhaust valve 2 is compensated for by reducing by a predetermined value the normal duration of the fully open period of the exhaust valve. It may be seen in FIG. 2 that the closing of the exhaust valve 2 is advanced, according to the present invention (curve C), compared to a cam of the prior art (curve A). It is thus possible to at least partially avoid increasing the total consumption of scavenging air due to the residual lift of the exhaust valve 2, and even, if desired, to reduce the said total consumption, as in the present invention, by reducing the angle D and therefore the normal period of full opening of the exhaust valve 2.

With the afore-described particular design of the cam 3, a cooling of 90° C. has been obtained on the bearing face of the exhaust valve 2 without increasing the total consumption of scavenging air, which is remarkable.

It will be observed that this device can work whatever the supercharging system used. The presence of puffs in the exhaust manifold following the exhaust conduit 21 cannot be detrimental to the cooling, since at high power values there is always available a scavenging rate which always ensures the presence of air in the exhaust conduit 21 extending from the valve 2 and thus permits a momentary reversal of the flow while at the same time preventing it from taking place with hot burned gases.

At very low loads where there is no longer a positive pressure difference available between the cylinder and the exhaust conduit, the opposite effect may occur, namely, a heating of the exhaust valve as a result of burned gas resucking, which is not detrimental and may even be favourable considering the low thermal level of the valve. This may also have a favourable effect on the combustion at low loads by reducing the ignition lag by raising the thermal level of the cycle, which usually is too low at low loads, especially in the case of highly supercharged engines.

Furthermore, especially in the case of the exhaust system described in prior U.S. patent application Ser. No. 870,465 filed on Jan. 18, 1978 of the applicant where fluctuations of the exhaust gas pressure in the exhaust manifold subsist, resulting in a dispersion of their temperature values at the outlet of each cylinder when use is made of the conventional scavenging taking place about the top dead-centre, the spread in time, according to the present invention, of the scavenging period (the resultant flow section of the simultaneously open intake valve and exhaust valve, respectively, being equal) allows such temperature dispersion to be reduced.

In highly supercharged engines and particularly in the case where the turbine (of the turbocharger) is supplied at substantially constant pressure according to the helix law, there often occur, during low-load running of the engine, exhaust valve temperatures which approximate or even are higher than those corresponding to running at nominal power, resulting from insufficient supercharging air pressure. The invention (and especially the method according to the invention) permits obtaining scavenging flow rate which increases as the engine speed diminishes, in more important proportions than with an engine with the usual type of cylinder scavenging, thus resulting, at such low load, in an increase in the speed of rotation of the turbocharger and therefore in an increase in the supercharging pressure.

According to a second form of embodiment of the device of the present invention, for an engine provided, for each valve, with an actuating system connecting the camshaft to the said valve, the said device is characterized, with reference to FIG. 4, in that the actuating system 31 of each exhaust valve is acted upon by the actuating system 32 of the intake valve of the same cylinder through a coupling connection such as particularly a mechanical coupling connection 30 between the said actuating systems 31, 32, allowing the said exhaust valve to be kept in an at least residual open position. Advantageously, the said mechanical coupling connection 30 is intercalated at any point of the valve actuating system extending from the camshaft inclusive to the said valve inclusive.

In the case of an engine with valves operated through the medium of push-members comprising rocker push-rods and rocker arms, the device according to the invention is characterized in that the mechanical coupling connection 30 comprises a lever intercalated in the said actuating system and connecting the actuating system 31 of at least one exhaust valve to the actuating system 32 of at least one intake valve of the same cylinder. Furthermore, one end 33 of lever 30 is movably connected, in a kinematically compatible way, to an element 34 of the actuating system 32 of the intake valve, whereas the other end 35 of lever 30 is intercalated in the actuating system 31 of the exhaust valve, thus separating the latter into two portions 36, 37 co-operating, through a movable joint such as particularly a spherical joint, with the lever 30 at two fulcrums or bearing points 38, 39, respectively, transversely shifted from one another along the lever, the resulting lever arm being such that the opening movement of the intake valve causes a predetermined residual opening of the exhaust valve.

Preferably, and as shown in FIG. 4, the lever 30 is located in the region of the mechanical connection between the push-members (40; 42) and the rocker arms (41; 43) of an exhaust valve and an admission valve, respectively. The push member 40 and the rocker arm 41 of the exhaust valve therefore constitute the said two portions 36, 37 of the actuating system co-operating with the lever 30 at the said two fulcrums 38, 39.

According to a specific feature of the device, an element 44 compensating for the transverse shift d of the two bearing points 38, 39 of the lever 30 co-operating with the push-member 40 and the rocker arm 41 of the exhaust valve is intercalated between one (39) of the two fulcrums 38, 39 of the lever 30 and one (41) of the two elements constituted by the rocker arm 41 and the push-member 40 which co-operates with the lever at the said fulcrum (39), whereas the other of the two elements constituting the push-member 40 and the rocker arm 41 co-operates with the said lever directly at the other fulcrum (38). The compensating element 44 allows the shift between the respective actuation axes of the push-member 40 and the rocker arm 41 of the exhaust valve to be reduced at least partially, thus substantially reducing the cantilever load which would otherwise be exerted thereon.

According to a specific feature of the invention, the axis of the push-member 40 of the exhaust valve rocker arm is inclined at a predetermined angle α with respect to the normal actuation axis of the push member 40°, which angle α allows the transverse shift between the two bearing points 38, 39 of the lever 30 to be completely compensated for and the bearing point 38 at which the lever co-operates with the push-member 40 of the exhaust valve rocker arm 41 to be obtained substantially on the axis of the thrust exerted on the rocker arm 41 of the said exhaust valve. The cantilever loads exerted on the push-member 40 and the rocker arm 41 are thus minimized.

According to another characterizing feature of the device of the invention, the aforesaid kinematically compatible connection of the lever 30 with an element 34 of the actuating system 32 of the intake valve is composed of a movable joint, one member 45 of which, provided at the corresponding end of lever 30, is displaceable in guided translation in the second member of the said movable joint, constituted by a cavity 46 adapted to the shape of the movable joint member 45 and provided in the element 34 of the actuating system of the intake valve.

According to a specific feature of the device of the invention, the joint portion 45 intercalated in the actuating system of the intake valve is cylindrical and its axis is perpendicular to the longitudinal axis of the lever. According to another specific feature, the joint portion 45 intercalated in the actuating system of the intake valve is spherical (as shown in FIG. 4) and the respective spherical joint centres of the three bearings (38, 39 and 45) of the lever 30 are located in a plane extending substantially through the thrust axes of the intake-valve actuating system and the exhaust-valve actuating system, respectively, the spherical joint centre 47 of the intermediate bearing 39 being shifted downward a distance e from the straight line interconnecting the two other centres 48, 49 so as to preclude any rotation of the lever 30 about its longitudinal axis.

The lever 30 in this second form of embodiment offers the same advantages as the additional boss 13 of the cam 3 of the afore-described first form of embodiment.

Indeed, owing to the kinematically compatible connection between the lever 30 and the element 34, the lever 30 does not interfere with the action of the push-member 40 on the rocker arm 41 during the opening of the exhaust valve, whereas after the opening of the intake valve under the lifting action of the push-member 42, the lever 30, owing to the lever arm formed by the laterally spaced bearing points 38, 39, acts upon the rocker arm 41 and keeps the exhaust valve in an at least partially residual open position during the whole open time of the intake valve. A mutual overlap of the opening periods of the intake valve and the exhaust valve, respectively, of a same cylinder is thus obtained between the instant of opening of the intake valve and substantially the instant of closing of the said intake valve thus resulting in a cooling which is substantially identical with the one obtained in the form of embodiment illustrated in FIGS. 1 to 3.

Thus, the shift between the fulcrums 38, 39 of the lever 30 is advantageously provided so that the reduced flow section between the valve and its seat is equal to or smaller than about 10% of the free flow section in the maximum open position of the exhaust valve.

In the case of an engine with hydraulically operated valves, the device according to the present invention is characterized in that the hydraulic operating means of the exhaust valve is associated with automatic control means ensuring the fulfilment of the afore-mentioned technical function of the method according to the present invention.

In the case of the first form of embodiment of the device according to the present invention, comprising an additional boss of the operating cam of each exhaust valve, such a device may be provided with a hydraulic system for taking up the clearance in the valve rocker system permitting the selection of the optimum value of the aforesaid residual lift of the exhaust valve 2.

In the case of the afore-described second form of embodiment, for an engine with valves provided with an actuating system for each valve extending from the camshaft to the said valve, such a device may include a hydraulic actuator incorporated in the actuating system 31 of the exhaust valve and connected to the actuating system 32 of the intake valve, ensuring the aforesaid residual opening of the exhaust valve.

Of course, the invention is by no means limited to the two forms of embodiment described and illustrated, which have been given by way of example only. In particular, it comprises all means constituting technical equivalents to the means described, as well as their combinations, should the latter be carried out according to its gist and used within the scope of the following claims.

What is claimed is:

1. Apparatus for improving the external cooling of an exhaust valve of an internal combustion engine having a working piston in a cylinder, an intake valve for admitting air into said cylinder, an exhaust valve for exhausting combustion gases from said cylinder, and operating cams, each having a circular base profile and a main boss with a leading valve opening profile, an intermediate full open profile, and a trailing valve closing profile, for controlling the opening and closing of said intake valve and exhaust valve, respectively, such that the open periods of the intake valve and the exhaust valve normally mutually overlap by a predetermined value, wherein the improvement comprises:

said operating cam of the exhaust valve having a residual lift portion of substantially constant radius, the leading part of which merges smoothly and progressively with the valve closing profile of the main boss of said cam and the trailing part of which merges smoothly and progressively with the circular base profile of the cam, said residual lift portion extending through a circular angle corresponding to at least the major part of the intake valve opening period, and the radial height of the residual lift portion being such that the residual lift portion produces a small free flow section between the valve and its seat relative to the free flow section of the fully open valve.

2. The apparatus of claim 1, wherein the merger of the trailing part of the residual lift portion of the exhaust valve is at an angular position corresponding substantially to that of the merger of the valve closing profile of the intake valve cam with its respective base profile.

3. The apparatus of claim 1, wherein said engine further includes a rocker arm operatively disposed between the operating cam of the exhaust valve and the exhaust valve, and the radial height of said residual lift portion of the cam above the circular base profile of the cam has the same order of magnitude as the clearance in the valve rocker system.

4. The apparatus of claim 1 wherein the radial height of said residual lift portion of the operating cam of the exhaust valve above the circular base profile of the cam is not greater than about 10% of the maximum radial height of the main boss of the cam above the circular base profile.

5. The apparatus of claim 1, wherein the full open profile of the main boss of the operating cam of the exhaust valve subtends an angle smaller than the corresponding normal full open angle for an exhaust valve cam without said residual lift portion.

* * * * *

UNITED STATES PATENT AND TRADEMARK OFFICE
CERTIFICATE OF CORRECTION

PATENT NO. : 4,296,715
DATED : October 27, 1981
INVENTOR(S) : Remi Curtil et al.

It is certified that error appears in the above—identified patent and that said Letters Patent is hereby corrected as shown below:

Column 1, line 63, after "residual" change "valve" to --value--.

Column 2, line 32, change last word "level" to --lever--.

Column 4, line 40, after "residual" change "valve" to --value--.

Column 6, line 12, after "obtaining" insert --a--.

Column 7, line 14, change "push member 40°" to --push-member 40--.

Signed and Sealed this

Ninth Day of March 1982

[SEAL]

Attest:

GERALD J. MOSSINGHOFF

*Attesting Officer*     *Commissioner of Patents and Trademarks*